United States Patent
Eck et al.

(10) Patent No.: US 8,069,844 B2
(45) Date of Patent: Dec. 6, 2011

(54) FUEL DELIVERY UNIT FOR A MOTOR VEHICLE

(75) Inventors: Karl Eck, Frankfurt (DE); Dieter Hagist, Lahnstein (DE); Matthias Kadler, Gross-Gerau (DE); Martin Maasz, Sulzbach (DE); Oliver Schönert, Arnsberg (DE); Michael Teichert, Schwalbach (DE)

(73) Assignee: Continental Automotive GmbH, Hannover (DE)

( * ) Notice: Subject to any disclaimer, the term of this patent is extended or adjusted under 35 U.S.C. 154(b) by 282 days.

(21) Appl. No.: 12/311,101

(22) PCT Filed: Sep. 13, 2007

(86) PCT No.: PCT/EP2007/059645
§ 371 (c)(1),
(2), (4) Date: Mar. 18, 2009

(87) PCT Pub. No.: WO2008/034757
PCT Pub. Date: Mar. 27, 2008

(65) Prior Publication Data
US 2009/0266341 A1    Oct. 29, 2009

(30) Foreign Application Priority Data

Sep. 18, 2006 (DE) .................... 10 2006 043 695

(51) Int. Cl.
*F02M 37/04* (2006.01)
*F02M 37/08* (2006.01)
(52) U.S. Cl. ........................................... 123/509
(58) Field of Classification Search ............ 123/509, 123/497, 495; 417/87, 151, 155
See application file for complete search history.

(56) References Cited

U.S. PATENT DOCUMENTS

| | | | |
|---|---|---|---|
| 5,392,750 A | 2/1995 | Laue et al. | |
| 5,960,775 A * | 10/1999 | Tuckey | 123/509 |
| 6,155,793 A | 12/2000 | Tuckey et al. | |
| 6,305,417 B1 | 10/2001 | Kleppner et al. | |
| 6,453,883 B2 | 9/2002 | Schreckenberger | |
| 6,457,945 B2 | 10/2002 | Kleppner et al. | |
| 6,478,014 B1 | 11/2002 | Kohlhaas | |
| 6,640,789 B2 * | 11/2003 | Gabauer et al. | 123/509 |
| 2001/0026760 A1 | 10/2001 | Kleppner et al. | |
| 2004/0050370 A1* | 3/2004 | Deichmann et al. | 123/509 |
| 2009/0013971 A1 | 1/2009 | Eck et al. | |

FOREIGN PATENT DOCUMENTS

| | | |
|---|---|---|
| DE | 42 42 242 | 6/1994 |
| DE | 19932684 | 2/2001 |
| DE | 29922473 U1 | 5/2001 |
| DE | 19961923 | 7/2001 |
| DE | 10328206 | 1/2005 |
| EP | 0959 242 | 11/1999 |
| EP | 1 103 717 | 5/2001 |
| JP | 6-213091 A | 8/1994 |
| JP | 11-082211 A | 3/1999 |
| JP | 2001-003826 A | 1/2001 |
| JP | 2001-065418 A | 3/2001 |
| JP | 2001-207929 A | 8/2001 |
| WO | WO 2007085536 | 8/2007 |

* cited by examiner

*Primary Examiner* — Mahmoud Gimie
(74) *Attorney, Agent, or Firm* — Cozen O'Connor

(57) ABSTRACT

A fuel delivery unit for a motor vehicle, wherein a swirl pot has a base formed from an upper part and a lower part, and an outer wall connected to the base, forming a seal. The upper part and the lower part bound fuel-delivering regions of a suction jet pump and of a section of a feed line. This arrangement allows the fuel delivery unit to be produced at particularly low cost.

10 Claims, 3 Drawing Sheets

FUEL DELIVERY UNIT FOR A MOTOR VEHICLE

PRIORITY CLAIM

This is a U.S. national stage of application No. PCT/EP2007/059645, filed on 13 Sep. 2007, which claims priority to the German Application No.: 10 2006 043 695.4, Filed: 18 Sep. 2006; the content of both being incorporated here by reference.

BACKGROUND OF THE INVENTION

1. Field of the Invention

The invention relates to a fuel delivery unit for a motor vehicle, having a fuel pump arranged in a swirl pot and configured to deliver fuel from the swirl pot into a feed line, a suction jet pump for delivering fuel into the swirl pot, a propellant line that leads from the fuel pump to a nozzle of the swirl pot, and a mixing tube, which opens out into the swirl pot, of the suction jet pump, with the swirl pot having a casing that is fastened to a base.

2. Description of the Prior Art

Fuel delivery units of this type are frequently used in modern motor vehicles and are known from practice. In the known fuel delivery units, individual components are inserted into the swirl pot, which is usually formed in one piece, and are connected to one another. A port, which projects away from the fuel pump, for a feed line usually projects out of the swirl pot. However, since a fine filter which is arranged in the feed line is often arranged within the swirl pot, the feed line from the fuel pump is guided back into the swirl pot to the fine filter. Furthermore, a branch is usually guided from the feed line to the suction jet pump which is provided for filling the swirl pot. This leads to a very large installation space of the known fuel delivery unit and a complex assembly.

SUMMARY OF THE INVENTION

The invention is based in part on the problem of refining a fuel delivery unit in such a way that said fuel delivery unit is of particularly simple and compact design.

According to one embodiment of the invention, the base has an upper part, which faces toward the fuel pump, and a lower part, which faces away from the fuel pump. The upper part and lower are sealed off with respect to one another and fuel-guiding regions are arranged between the upper part and the lower part of the base.

In one embodiment, partial regions of the fuel-guiding regions, such as of the lines, are arranged within the base of the swirl pot. The upper part and the lower part preferably form shell-shaped components that receive sections of the lines. Said lines therefore are no longer mounted separately. Components projecting from the swirl pot easily avoided. Furthermore, by a corresponding arrangement of a parting plane in the base, the upper part and lower part are produced in each case as axially demoldable injection-molded parts.

The fuel delivery unit according to one embodiment of the invention is of particularly simple structural design if the fuel-guiding regions of the base have a section, which leads from the fuel pump to the fine filter which is arranged in the swirl pot. A feed line, with a section of the feed line being delimited partially by the upper part and the lower part of the base leads the fuel to the fine filter. The upper part and the lower part are preferably each formed as a half-shell and bear against one another to delimit the section of the feed line. This contributes to a particularly compact design of the fuel delivery unit.

To further simplify the structural design of the fuel delivery unit according to one embodiment of the invention, it is expedient if the fuel-guiding regions of the base have a mixing tube of a suction jet pump, with the mixing tube being formed partially by the upper part and by the lower part of the base. The upper part and the lower part of the base are preferably formed as a half-shell and bear against one another to delimit the mixing tube. This contributes to a particularly compact design of the fuel delivery unit.

To further reduce a number of components of the fuel delivery unit according to one embodiment of the invention, it is expedient if the upper part of the base and a casing seal a fine filter arranged in the swirl pot.

According to another advantageous refinement of the invention, the structural expenditure for the precise alignment of the components of the base plate is kept particularly low because the upper part and the lower part of the base each have annular edges which bear against one another. The upper part of the base and the lower part of the base preferably have positively locking surfaces that correspond to one another and the upper part and lower base parts engage into one another in a positively locking manner.

To further simplify the alignment of the components of the swirl pot, it is expedient if at least one of the edges of the upper base part or of the lower base part is sealed with respect to the casing of the swirl pot. The base of the swirl pot is also reliably sealed in this way.

The mixing tube of the suction jet pump can, in one embodiment open into a chamber, which is closed off by means of a base valve of the swirl pot. However, to further reduce the number of components of the fuel delivery unit according to an embodiment of the invention, it is expedient if the mixing tube is sealingly connected to a riser tube that is formed in one piece with the casing of the swirl pot. The riser tube extends into a region that is remote from the base and is the intended maximum filling level of the swirl pot. As a result, the swirl pot does not require a base valve, since the length of the riser tube limits the filling level in the swirl pot. Since the riser tube is arranged on the casing of the swirl pot and extends over a partial region of the height thereof, the swirl pot can be produced together with the riser tube in a particularly cost-effective manner in an axially demoldable injection mold.

According to another embodiment of the invention, to further reduce the number of components of the fuel delivery unit, it is expedient if a section, which leads away from the fine filter, of the feed line is formed in one piece with the casing of the swirl pot.

The assembly of the fuel delivery unit according to one embodiment of the invention is particularly simple if ports of the nozzle of the suction jet pump and of the section of the feed line, which leads from the fuel pump to the fine filter, are aligned perpendicular to the surface of the base of the swirl pot. As a result of the design, the fuel pump is plugged axially onto the ports in a simple manner, and is thereby fully mounted. Here, a suction port of the fuel pump preferably opens out into the base region of the swirl pot.

BRIEF DESCRIPTION OF THE DRAWINGS

The invention permits numerous embodiments. To further clarify its basic principle, one of said embodiments is illustrated in the drawing and is described below. In the drawings.

DETAILED DESCRIPTION OF THE PRESENTLY PREFERRED EMBODIMENTS

Figure 1:
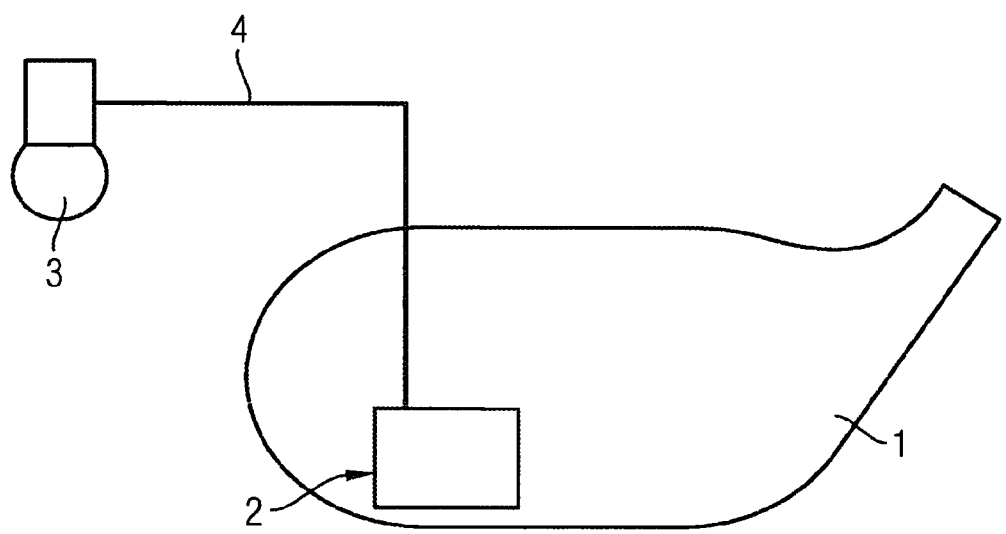
FIG. 1 schematically shows a fuel supply device for an internal combustion engine of a motor vehicle having a fuel delivery unit according to one embodiment of the invention.

FIG. 1 schematically shows a fuel delivery unit 2, which is arranged in a fuel tank 1 of a motor vehicle, for delivering fuel to an internal combustion engine 3 of a motor vehicle. The fuel delivery unit 2 sucks in fuel from the base region of the fuel tank 1 and delivers said fuel into a feed line 4 which leads to the internal combustion engine 3.

Figure 2:
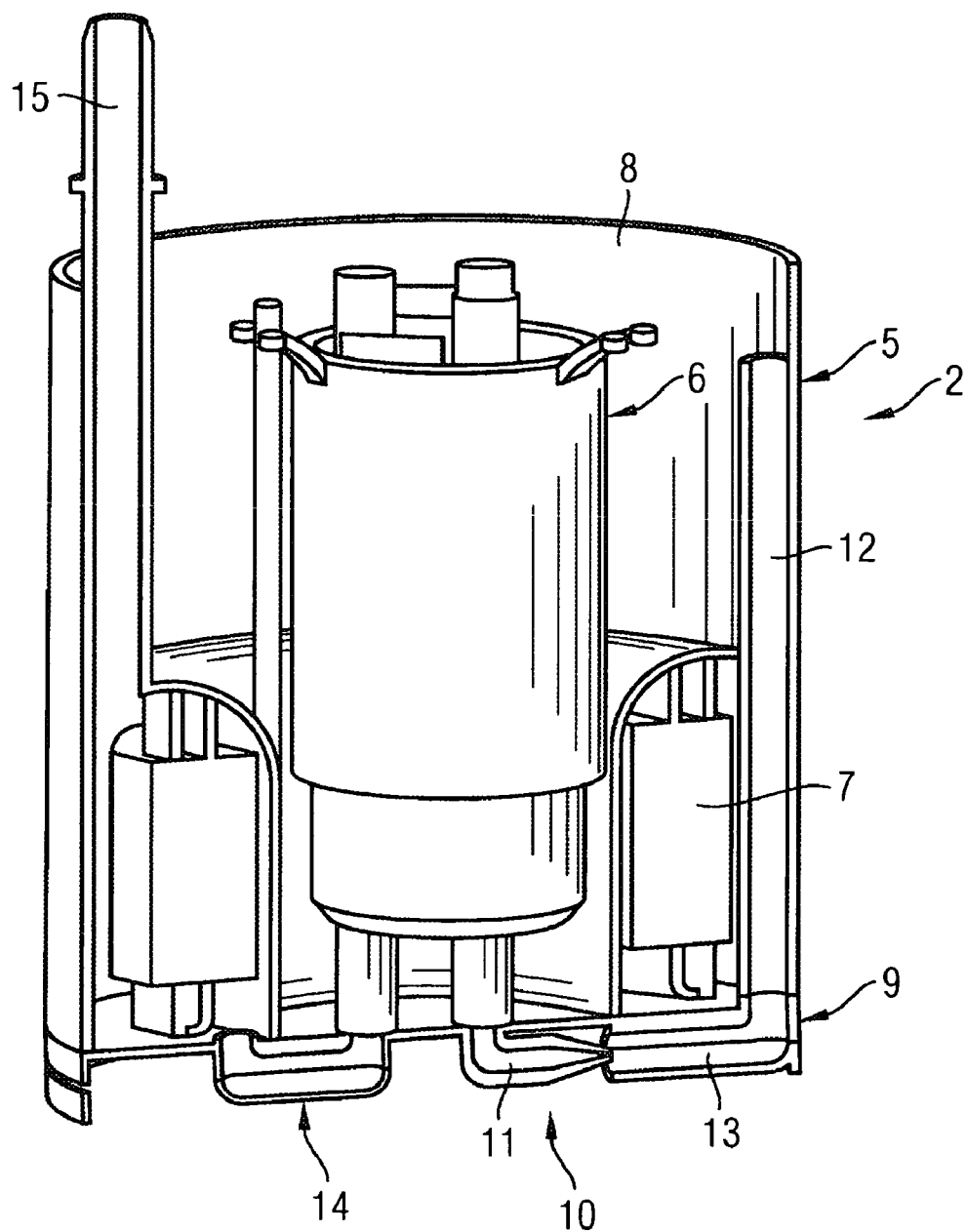
FIG. 2 is a sectional illustration of the fuel delivery unit according to the embodiment of the invention from FIG. 1.

FIG. 2 shows, on a greatly enlarged scale, a sectional view of the fuel delivery unit 2 from FIG. 1 with an electrically operated fuel pump 6 which is arranged in a swirl pot 5. A fine filter 7 is also arranged in the swirl pot 5. The swirl pot 5 has a base 9 which is connected to a casing 8. The base 9 and the casing 8 seal off the fine filter 7. The base 9 also has a suction jet pump 10. The suction jet pump 10 is supplied with fuel as propellant by the fuel pump 6, draws fuel out of the surroundings of the swirl pot 5 and delivers said fuel into the swirl pot 5. For this purpose, the suction jet pump 10 has a nozzle 11 which is connected to the fuel pump 6. The casing 8 of the swirl pot 5 is connected in one piece to a riser tube 12. The riser tube 12 is connected to a mixing tube 13, which is arranged in the base 9, of the suction jet pump 10. A section 14 of the feed line 4 from the fuel pump 6 to the fine filter 7 also leads through the base 9. A further section 15, which is arranged downstream of the fine filter 7 in the flow direction, of the feed line 4 is formed in one piece with the casing 8 of the swirl pot 5.

Figure 3:
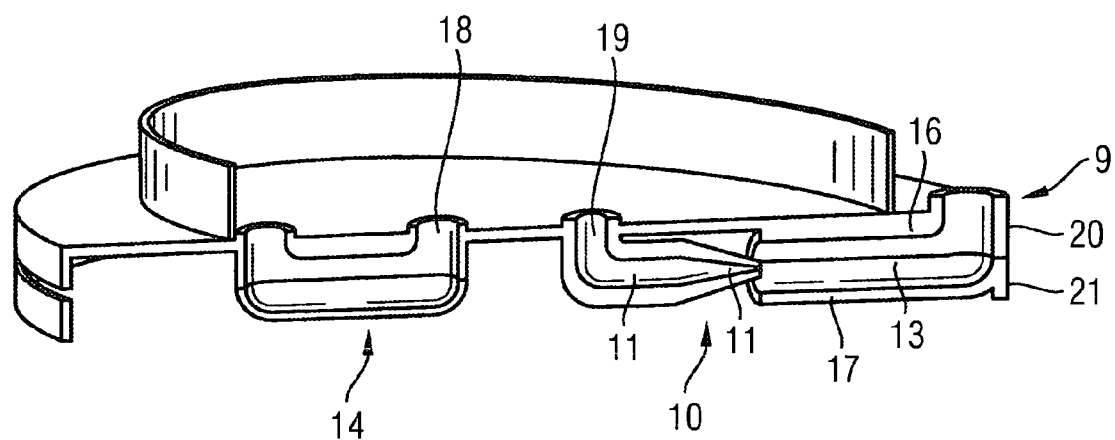
FIG. 3 is, on a greatly enlarged scale, a sectional illustration of a base of a swirl pot of the fuel delivery unit according to the embodiment of the invention from FIG. 1.

FIG. 3 shows, on a greatly enlarged scale, the base 9 of the swirl pot 5 from FIG. 1. Here, it can be seen that the base 9 has an upper part 16 and a lower part 17 which is sealingly connected to the upper part 16. The upper part 16 and the lower part 17 form in each case one part of the mixing tube 13 of the suction jet pump 10 and that section 14 of the feed line 4 which leads from the fuel pump 6 to the fine filter 7. Port 18 of that section 14 of the feed line 4 which is arranged between the fuel pump 6 and the fine filter 7 and port 19 of the suction jet pump are aligned substantially perpendicular to the surface on the base 9, such that the fuel pump 6 illustrated in FIG. 2 can be easily plugged on to port 18, 19 in order to be mounted. Furthermore, FIG. 3 shows that the upper part 16 and the lower part 17 of the base 9 each have annular edges 20, 21 which bear against one another. The edges 20, 21 are sealed off with respect to the casing 8, illustrated in FIG. 2, of the swirl pot 5.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A fuel delivery unit for a motor vehicle, comprising:
a swirl pot casing forming a swirl pot;
a fuel pump arranged in the swirl pot, the fuel pump configured to deliver fuel from the swirl pot into a feed line;
a suction jet pump configured to deliver the fuel into the swirl pot, the suction jet pump comprising:
a nozzle;
a propellant line coupled between the fuel pump and the nozzle; and
a mixing tube coupled to the nozzle, the mixing tube feeding the fuel into the swirl pot;
a base section fastened to the swirl pot casing, the base section comprising:
an upper base part having a first side that faces toward the fuel pump and a second side opposite the fuel pump; and
a lower base part that faces the second side of the upper part,
wherein at least one of the mixing tube, the propellant line, and the nozzle is arranged between the second side of the upper base part and the lower base part.

2. The fuel delivery unit according to claim 1, further comprising:
a fine filter arranged in the swirl pot; and
a fuel-guiding region in the base coupled between the fuel pump and the fine filter, the fuel-guiding region being delimited partially by the upper base part and the lower base part.

3. The fuel delivery unit according to claim 1, wherein the mixing tube is formed partially by the upper base part and by the lower base part.

4. The fuel delivery unit according to claim 2, wherein the upper base part and the casing form a compartment for the fine filter.

5. The fuel delivery unit according to claim 1, wherein the upper base part and the lower base part each have annular edges configured to bear against one another.

6. The fuel delivery unit according to claim 5, wherein at least one of the edges of the upper base part or of the lower base part is sealed to the casing.

7. The fuel delivery unit according to claim 1, wherein the mixing tube is connected to a riser tube formed in one piece with the casing, the riser tube extending into a region of the swirl pot remote from the base to an intended maximum filling level of the swirl pot.

8. The fuel delivery unit according to claim 2, wherein a line section that leads away from the fine filter is formed in one piece with the casing.

9. The fuel delivery unit according to claim 2, wherein ports of the nozzle of the suction jet pump and of the fuel-guiding region, are substantially perpendicular to a surface of the base that faces toward the fuel pump.

10. The fuel delivery unit according to claim 1, wherein at least one of the upper base part and the lower base part are axially demoldable injection molded parts.

* * * * *